United States Patent [19]
Nakaishi

[11] Patent Number: 5,555,549
[45] Date of Patent: Sep. 10, 1996

[54] PROCESS FOR MODIFYING A SURFACE OF A FLUORORESIN PRODUCT

[75] Inventor: Hiroyuki Nakaishi, Osaka, Japan

[73] Assignee: Sumitomo Electric Industries, Ltd., Osaka, Japan

[21] Appl. No.: 402,097

[22] Filed: Mar. 9, 1995

[30] Foreign Application Priority Data

Mar. 11, 1994 [JP] Japan ................... 6-040693

[51] Int. Cl.$^6$ ................... C08J 7/00
[52] U.S. Cl. ................... 378/64; 378/51
[58] Field of Search ................... 378/64, 66, 51; 428/421, 422

[56] References Cited

U.S. PATENT DOCUMENTS

| | | | |
|---|---|---|---|
| 3,111,424 | 11/1963 | Le Clair . | |
| 4,218,294 | 8/1980 | Brack | 522/8 |
| 4,879,176 | 11/1989 | Ouderkirk et al. | 428/323 |
| 5,286,567 | 2/1994 | Kubota et al. | 428/422 |

FOREIGN PATENT DOCUMENTS

| | | |
|---|---|---|
| 3-57143 | 8/1991 | Japan . |
| 3-259932 | 11/1991 | Japan . |
| 3-269024 | 11/1991 | Japan . |

OTHER PUBLICATIONS

"Genshiryoku Kogyo" vol. 39, No. 4, pp. 56 to 59 No date.

*Primary Examiner*—David P. Porta
*Attorney, Agent, or Firm*—W. G. Fasse; W. F. Fasse

[57] ABSTRACT

In a process that can readily modify a surface of a fluororesin product in a short time, the surface of the fluororesin product is irradiated with synchrotron radiation having a wavelength of not more than 100 nm. The synchrotron radiation preferably has a peak of radiant intensity in the wavelength region of about 3 nm to about 6 nm. Such irradiation with the synchrotron radiation is carried out under an atmosphere containing oxygen, a mixture of nitrogen and hydrogen, a mixture of oxygen and hydrogen, or a mixture of oxygen, nitrogen and hydrogen, whereby hydrophilic groups can be introduced into the surface. The fluororesin product of which the surface is modified is improved in wettability with respect to a paint, and adhesiveness to another material.

18 Claims, 9 Drawing Sheets

FIG. 3 (A, B, C, D PRIOR ART)
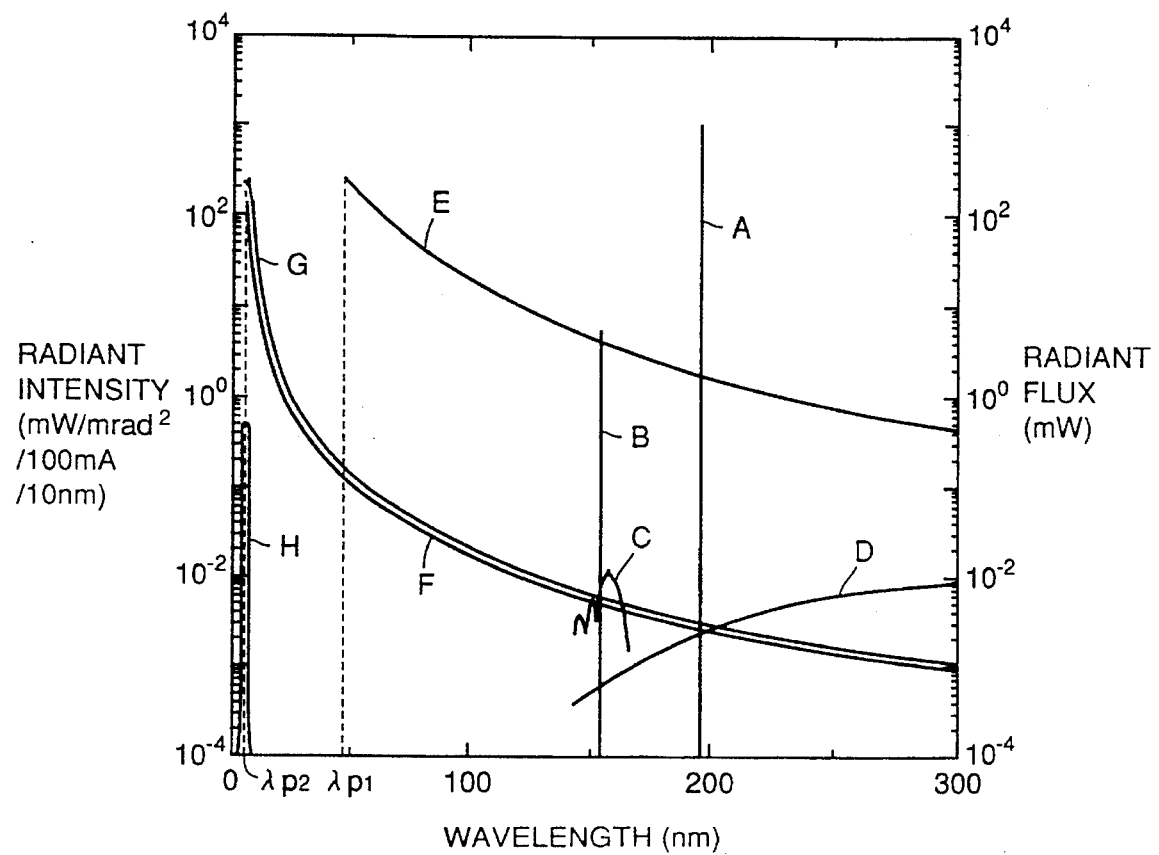

PROCESS FOR MODIFYING A SURFACE OF A FLUORORESIN PRODUCT

BACKGROUND OF THE INVENTION

1. Field of the Invention

The present invention relates to a process for modifying a surface of a fluororesin product, and more particularly, it relates to a process capable of readily preparing a fluororesin product which is improved in wettability of its surface etc. in a short time by irradiating the surface thereof with synchrotron radiation.

2. Description of the Background Art

Fluororesin has excellent chemical resistance, heat resistance and durability, high electric insulation, and electric characteristics such as a low dielectric constant. A surface of fluororesin is inferior in wettability, and has water repellency and oil repellency. Due to such excellent characteristics, fluororesin is widely employed in various industrial fields.

While fluororesin products may be directly employed as moldings having various shapes, it is sometimes desired to apply printing or paint onto a surface of some fluororesin products before they are put into practice. Furthermore, while fluororesin is generally employed as an independent or singular material, it may also be bonded to or laminated with another material, to be employed as a composite material.

Due to the inferior wettability of fluororesin, however, it is difficult to print or paint a surface of a fluororesin product. Disadvantageously, a print or paint film that has been applied on a surface of a fluororesin product can be easily separated from the surface. Further, it is also difficult to bond or laminate fluororesin to or with another material. In a composite material including fluororesin, the fluororesin material is easily separated from the other material whereby the quality of the composite material is deteriorated. In a fluororesin molding such as a container, it is a further disadvantage that bubbles appearing on or adhering to its surface are difficult to remove or separate therefrom.

On the other hand, fluororesin is also molded into porous materials, and applied to various filters. Such a filter of fluororesin may be generally provided with a hydrophilic function on surfaces of its pores, in response to its object and application.

In order to solve the aforementioned problems of the conventional fluororesin products, there have generally been proposed various methods for improving the wettability etc. of the fluororesin surfaces. Among such methods, a method of modifying a surface of a fluororesin product by irradiating the surface with light and causing a photochemical reaction therein is particularly noted, because it causes no problems in its process chemicals.

Japanese Patent Publication No. 3-57143 (1991) discloses a method of irradiating a surface of a polytetrafluoroethylene product with a pulsed beam emitted from an excimer laser having a wavelength region of 95 to 200 nm. On the other hand, Japanese Patent Laying-Open No. 3-259932 (1991) discloses a method of irradiating a surface of a fluororesin product with vacuum ultraviolet light having a wavelength of not more than 190 nm. In this method, the vacuum ultraviolet light is emitted from a rare gas discharge plasma light source. Further, Japanese Patent Laying-Open No. 3-269024 (1991) discloses a method of irradiating a fluororesin product with ultraviolet light having a wavelength of not more than 1800 Å.

On the other hand, "Genshiryoku Kogyo" Vol. 39, No. 4 (1993), pp. 56 to 59 discloses a process of previously adding a substance, such as total aromatic polyester or polyether ketone, that absorbs light having a wavelength of at least 200 nm to a fluororesin product and thereafter irradiating a surface of the fluororesin product containing the light absorptive substance with light having a wavelength of 248 nm emitted from a KrF excimer laser beam source. The KrF excimer laser is a light source that can obtain a high output with stable oscillation. According to this method, it is possible to treat the target in the atmosphere at ordinary temperature, without requiring a large reaction vessel and a vacuum unit. Therefore, this method is regarded as being suitable for industrialization. In this method, however, it is impossible to effectively modify a product of resin that consists of only a C-X bond (X: hydrogen, nitrogen or fluorine) containing no light absorptive substance.

A surface of a fluororesin product which is modified by a conventional method is disadvantageously insufficient in hydrophilicity and adhesiveness. FIGS. 4(a) and 4(b) are sectional views typically showing surfaces of resin products prepared by conventional methods. Referring to FIG. 4(a), numeral 110 denotes a fluororesin molding, numeral 110a (in a two-dot chain line) denotes an unmodified surface, numeral 110b denotes a modified surface, numeral 111 denotes a modified layer, symbol d denotes the thickness of the modified layer 111, and arrow 50 denotes light which is applied for the modification. In the conventional method, the light 50 merely slightly penetrates into the interior of the fluororesin molding 110, and hence the modified layer 111 has a small thickness d. The thickness d of the modified layer 111 that can be formed by the conventional method is about 1 µm at the most. A texture formed on a surface of a fluororesin product by a conventional method is so small that a printing ink, a paint or another material can hardly penetrate into the surface. Thus, such a material insufficiently adheres to the fluororesin product.

FIG. 4(b) typically shows a section of a porous fluororesin molding whose surface is modified by a conventional method. Referring to FIG. 4(b), numeral 120 denotes the porous fluororesin molding, numeral 120a (in a two-dot chain line) denotes an unmodified surface, numeral 120b denotes a modified surface, numeral 122 denotes pores of the molding 120, numeral 122R denotes surfaces of the pores 122, and arrow 50 denotes light which is applied for modification. Using this conventional method, the light 50 merely reaches a portion which is close to the surface 120b as irradiated, and hence the pores 122 are insufficiently modified. Therefore, a technique of modifying the overall pores of a porous material such as a filter, has generally been awaited in the field.

SUMMARY OF THE INVENTION

An object of the present invention is to provide a process that can readily and quickly improve the wettability, hydrophilicity, printability and adhesiveness of a surface of a fluororesin product.

Another object of the present invention is to provide a process that can introduce a larger number of hydrophilic groups into a surface of a porous fluororesin molding.

One aspect of the present invention provides a process for modifying a surface of a fluororesin product, which comprises a step of irradiating the surface of the fluororesin product with synchrotron radiation having a wavelength of not more than 100 nm.

According to another aspect of the present invention, a method of modifying a surface of a fluororesin product comprises a step of irradiating the surface of the fluororesin product with synchrotron radiation having a peak of a light quantity at least in a wavelength region of at least 3 nm and not more than 6 nm.

The term "synchrotron radiation" in this specification indicates an electromagnetic wave which is emitted when the orbit of high-energy electrons whose velocity is close to that of light is bent by a magnetic field in an accelerator.

The term "peak of light quantity" in this specification indicates the maximal or maximum radiant intensity in the spectrum of synchrotron radiation. It is possible to control the wavelength having the peak of the light quantity to a desired value by changing the level of magnetic force of an electron storage ring (SR ring) provided in a synchrotron radiation beam unit (light source).

According to the present invention, the fluororesin product can be preferably irradiated with the synchrotron radiation under an atmosphere containing a gas selected from the group consisting of oxygen, a mixture of nitrogen and hydrogen, a mixture of oxygen and hydrogen, and a mixture of oxygen, nitrogen and hydrogen. It is possible to introduce hydrophilic groups into the surface of the fluororesin product by irradiating the same under such an atmosphere.

According to the present invention, it is possible to improve the surface of the fluororesin product in wettability with respect to a paint by irradiating the surface with the synchrotron radiation. According to the present invention, further, it is possible to improve the adhesion of the surface of the fluororesin product, and provide the surface with hydrophilicity.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates relations between wavelengths and radiant intensity levels of beams emitted from various light sources;

Figure 1:
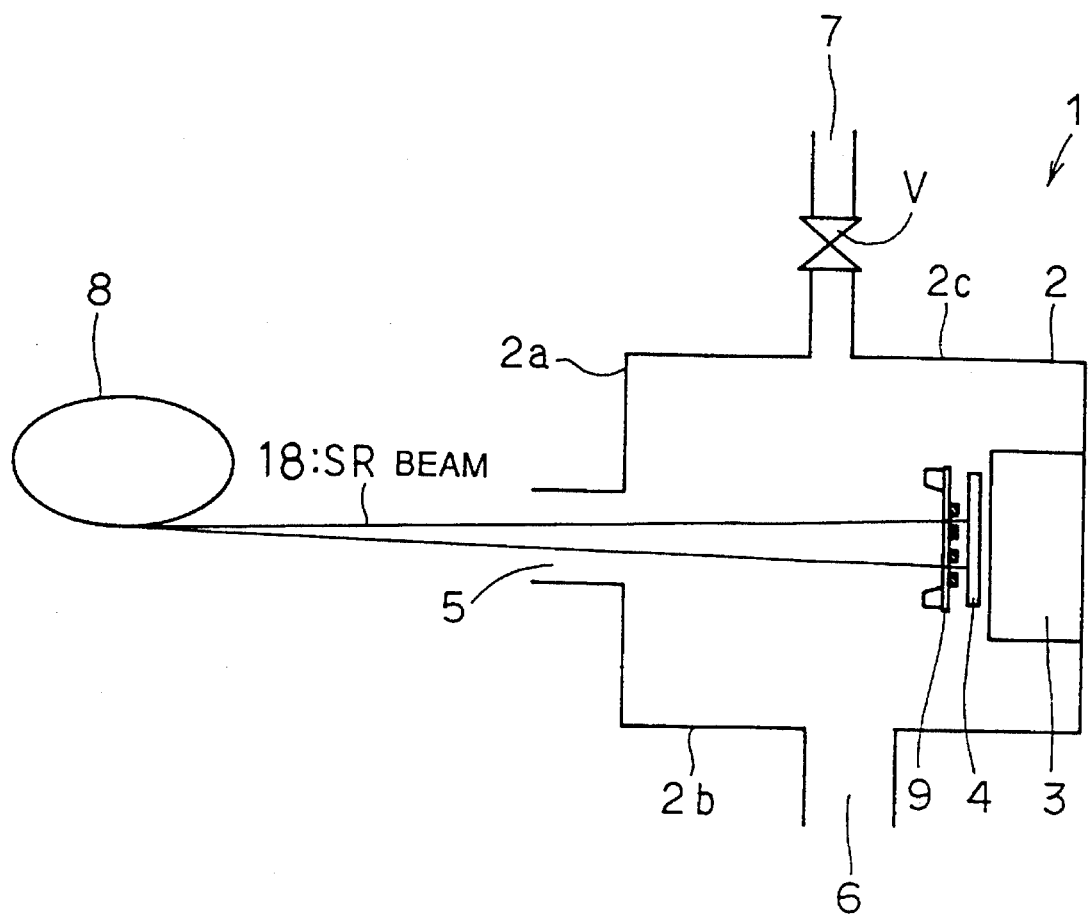
FIG. 1 is a model diagram showing a fluororesin modifying apparatus which is preferably employable in the present invention.

DETAILED DESCRIPTION OF THE PREFERRED EMBODIMENTS AND OF THE BEST MODE OF THE INVENTION

Fluororesin which is employed in the present invention may simply have a C-F bond, and can be prepared from polytetrafluoroethylene (PTFE), a tetrafluoroethylene-hexafluoropropylene copolymer (FEP), a tetrafluoroethylene-perfluoroalkylvinylether copolymer (PFA), a chlorotrifluoroethylene-ethylene copolymer (ECTFEE), polychlorotrifluoroethylene (PCTFE), an ethylene-tetrafluoroethylene copolymer (ETFE), polyvinylidene fluoride (PVDF) or polyvinyl fluoride (PVF), for example. While the fluororesin product may be in the form of powder, it is generally employed as a member having a prescribed shape such as a tube, a rod, a porous body, woven fabric, nonwoven fabric or fiber. A compounding agent, an additive or a processing aid may be added to the fluororesin product which is employed in the present invention, in order to obtain a molding. It is possible to attain an effect of the present invention in a fluororesin product, even when it is blended with a plasticizer, a stabilizer, a lubricant, a filler, an extender, a pigment, a dye, a heat resistance improver, a flame retarder, an antioxidant, a weathering inhibitor, a light absorber, a surface-active agent, a cross-linking agent, a defogger, a vapor barrier or an elasticity improver, for example. In order to obtain a molding from fluororesin, it is possible to preferably employ a well-known technique such as casting, melt extrusion, calendering, centrifugation or compression.

The process according to the present invention is preferably carried out in an atmosphere containing at least one gas selected from the group consisting of oxygen, nitrogen and hydrogen. When a texture is mainly to be formed on the surface of the fluororesin product for improving its adhesiveness with respect to a printing ink, a paint or another material, the atmosphere gas may be prepared from any of oxygen, nitrogen, hydrogen, a mixture of oxygen and nitrogen, a mixture of nitrogen and hydrogen, a mixture of hydrogen and oxygen, and a mixture of oxygen, nitrogen and hydrogen. On the other hand, when hydrophilic groups are particularly to be introduced into the surface of the fluororesin product in the present invention to obtain a surface having high hydrophilicity, the atmosphere gas is preferably prepared from any one of oxygen, a mixture of nitrogen and hydrogen, a mixture of oxygen and hydrogen, and a mixture of oxygen, nitrogen and hydrogen. When oxygen is employed as the atmosphere gas, it is possible to mainly form carbonyl groups on the surface of the fluororesin product. When a mixed gas of nitrogen and hydrogen is employed, on the other hand, it is possible to mainly introduce amino groups into the surface. When a mixed gas of oxygen and hydrogen is employed, further, it is possible to mainly form carbonyl, carboxyl and hydroxyl groups on the surface. When a mixed gas of oxygen, nitrogen and hydrogen is employed, in addition, it is possible to mainly form carbonyl, carboxyl, hydroxyl and amino groups on the surface.

The wavelength of the synchrotron radiation employed in the present invention is not more than 100 nm, and more preferably less than 95 nm. This is because a C-X bond (X: hydrogen, nitrogen or fluorine) has a broad light absorption band in a wavelength region of at least about 5 nm and not more than 100 nm. The wavelength is set to be less than 95 nm, since the C-X bond more specifically exhibits strong light absorption in the vicinity of 90 nm.

More specifically, the synchrotron radiation employed in the present invention is preferably a continuous beam of not more than 100 nm in wavelength having a peak of its light quantity in the range of at least 3 nm and not more than 100 nm, and more preferably, a continuous beam of less than 95 nm in wavelength having a peak of its light quantity in the range of at least 3 nm and less than 95 nm. It is possible to irradiate the fluororesin product with light corresponding to the absorption band of the C-X bond by applying light of this wavelength region.

In a more preferable mode, the synchrotron radiation which is employed in the present invention can have a peak of its light quantity in a wavelength region of at least 3 nm and not more than 6 nm. The C-X bond has the peak of its light absorption band in the vicinity of 5 nm (50 Å), and hence a photochemical reaction of the fluororesin product can be efficiently caused by synchrotron radiation having a peak in this wavelength region.

On the other hand, a preferable wavelength region of the synchrotron radiation employed in the present invention is varied with the type of the atmosphere gas. When oxygen gas is employed as the atmosphere gas, the wavelength of the synchrotron radiation is preferably in the vicinity of a wavelength of 30 Å at which oxygen gas ($O_2$) has its light absorption band, or in a wavelength region of at least 40 Å and not more than 1027 Å. When nitrogen is employed as the atmosphere gas, on the other hand, the wavelength of the synchrotron radiation is preferably in the vicinity of 40 Å at which $N_2$ has its light absorption band, or in a wavelength region of at least 5 nm and not more than 80 nm. When hydrogen is employed as the atmosphere gas, further, the wavelength of the synchrotron radiation is preferably in a wavelength region of not more than 80 nm at which $H_2$ has its light absorption band. Thus, the synchrotron radiation preferably has a wavelength of not more than 1027 Å, more preferably not more than 80 nm.

The inventive process is preferably carried out under a vacuum of at least $10^{-7}$ Torr and not more than $10^{-5}$ Torr. When a gas of $O_2$, $N_2$ or $H_2$ is employed in the present invention, further, the atmosphere preferably contains the gas in a total pressure of at least $10^{-2}$ Torr and not more than 1 Torr.

The present invention utilizes a light excitation reaction by the synchrotron radiation. Thus, the relation between the light absorption spectrum of fluororesin and/or the light absorption spectrum of the atmosphere gas and the spectrum of the synchrotron radiation for exciting the same is taken into consideration. The light absorption spectra of fluororesin and the atmosphere and the spectrum of the synchrotron radiation will now be described in more concrete terms.

(1) Light Absorption Spectrum of Fluororesin

Figure 5:
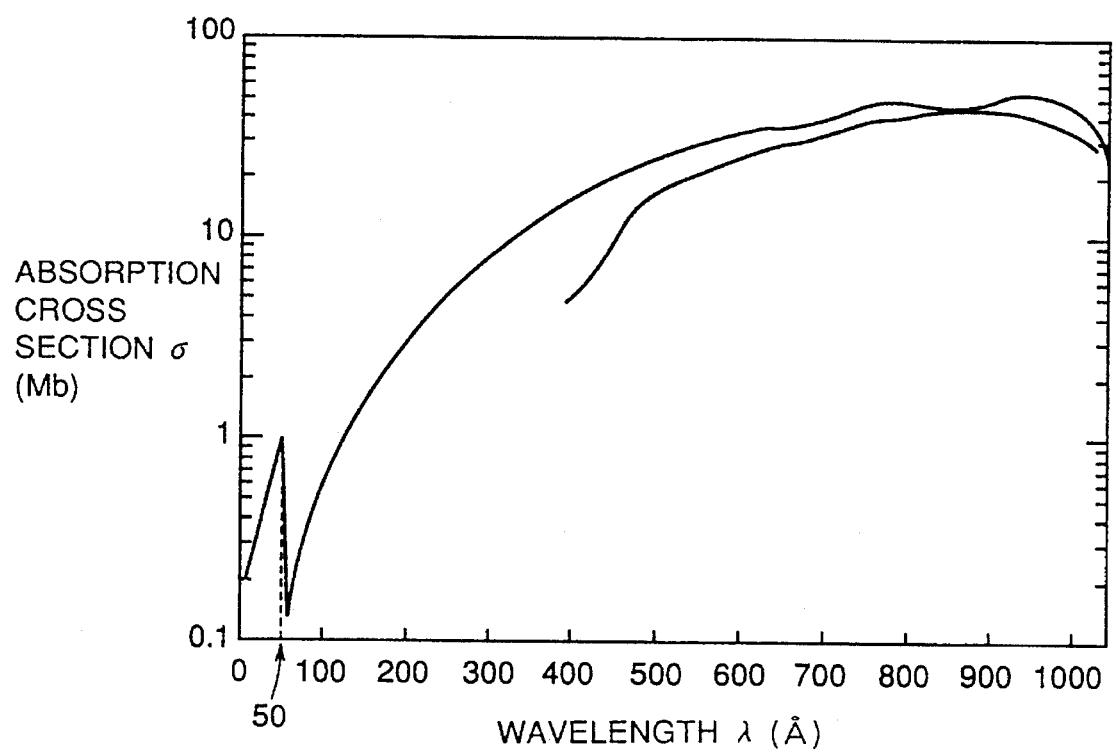
FIG. 5 illustrates the light absorption spectrum of methane ($CH_4$)
Figure 6:
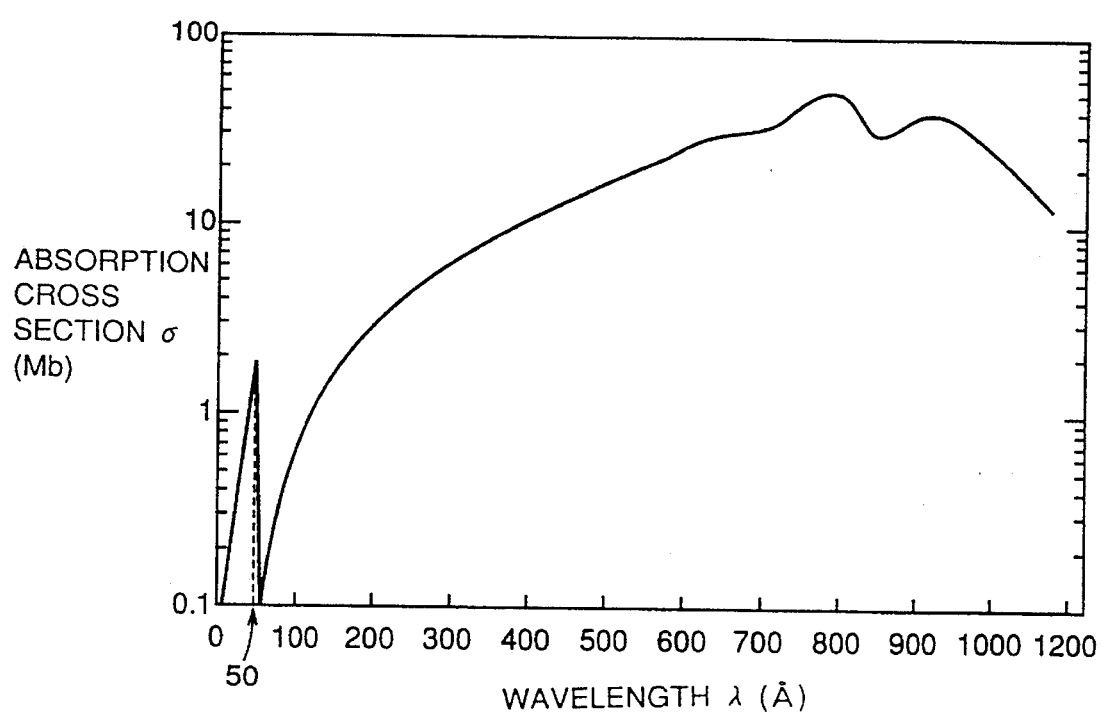
FIG. 6 illustrates the light absorption spectrum of ethylene ($C_2H_4$)

Every C-X bond (X: hydrogen, nitrogen or fluorine) has a light absorption band with a peak in the vicinity of a wavelength of 5 nm, and a broad light absorption band with an absorption peak around 90 nm in a wavelength region of at least 5 nm and not more than 100 nm. For reference, FIGS. 5 and 6 illustrate the light absorption spectra (relations between wavelengths and absorption cross sections) of methane ($CH_4$) and ethylene ($C_2H_4$), which are similar to that of fluororesin.

(2) Light Absorption Spectrum of Atmosphere Gas

Figure 7:
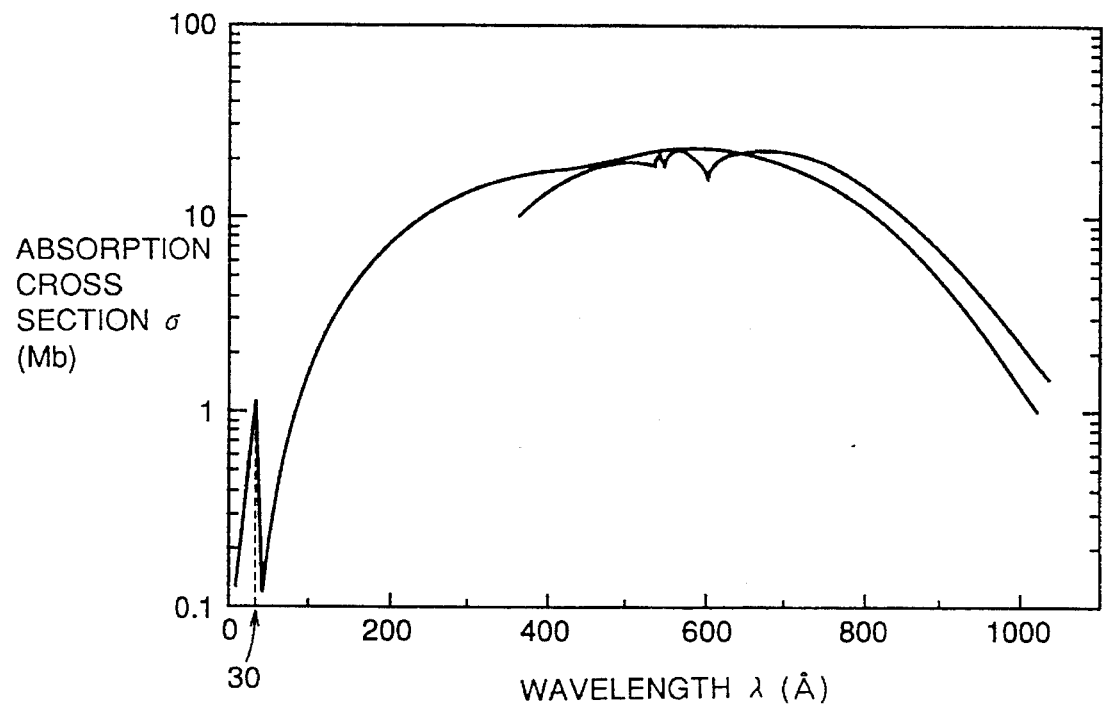
FIG. 7 illustrates the light absorption spectrum of oxygen ($O_2$)
Figure 8:
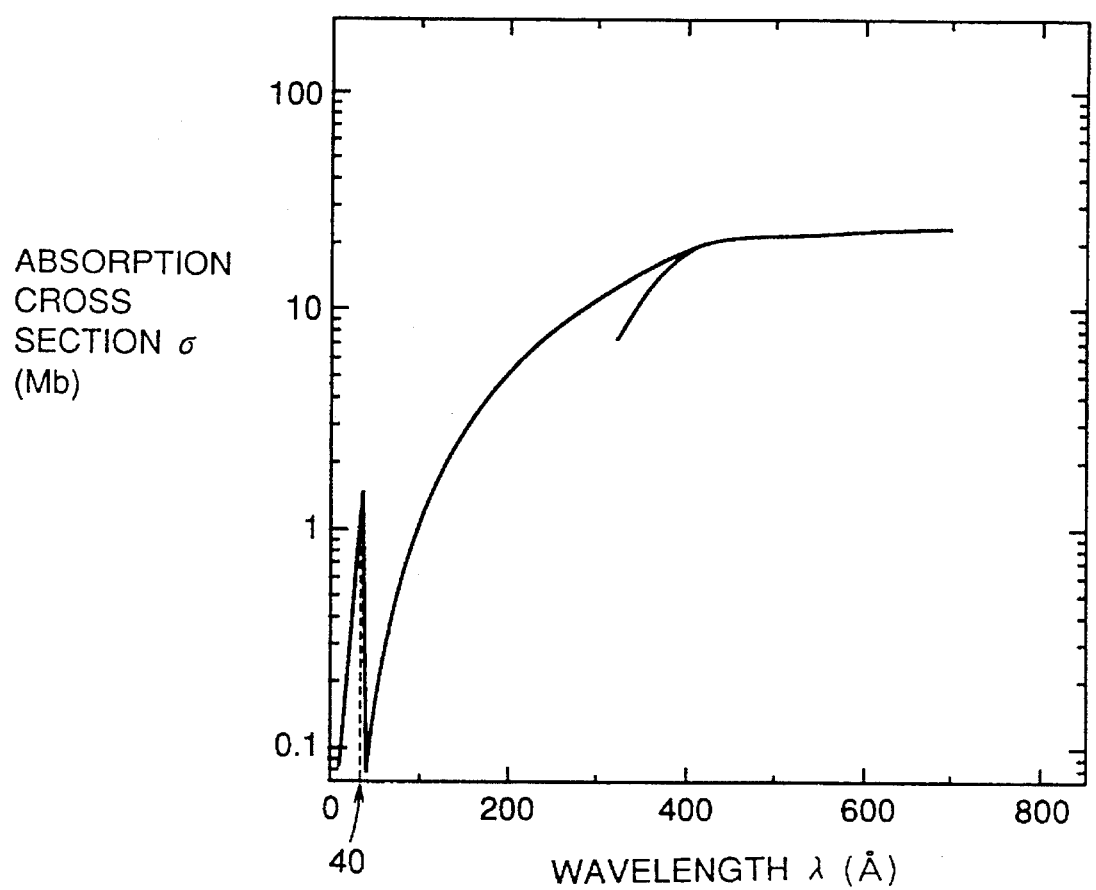
FIG. 8 illustrates the light absorption spectrum of nitrogen ($N_2$)
Figure 9:
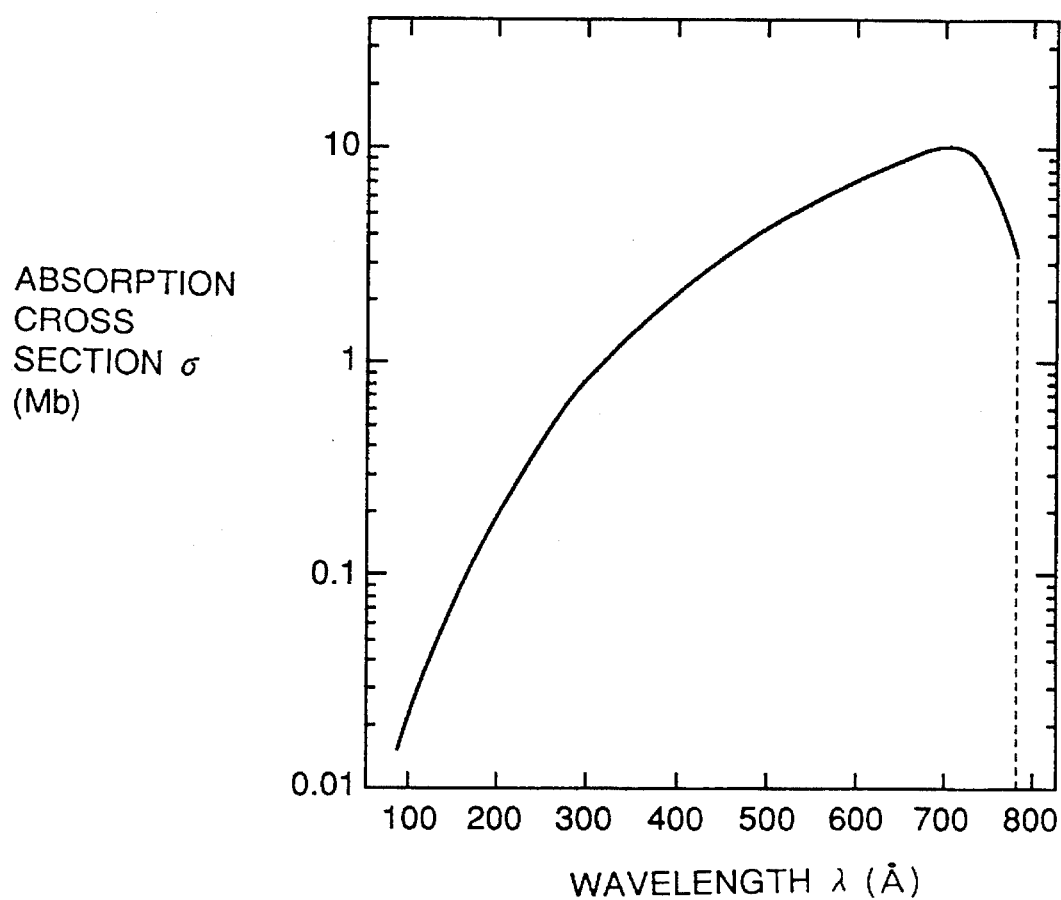
FIG. 9 Illustrates the light absorption spectrum of hydrogen ($H_2$).

FIG. 7 illustrates the light absorption spectrum of oxygen ($O_2$). Oxygen has a light absorption band with a peak in the vicinity of a wavelength of 3 nm, and a broad light absorption band in a wavelength region of at least 4 nm and not more than 100 nm. FIG. 8 illustrates the light absorption spectrum of nitrogen ($N_2$). Nitrogen has a light absorption band with a peak in the vicinity of a wavelength of 4 nm, and a broad light absorption band in a wavelength region of at least 5 nm and not more than 80 nm. FIG. 9 illustrates the light absorption spectrum of hydrogen ($H_2$). Hydrogen has a broad light absorption band in a wavelength region of not more than 80 nm. As clearly understood from FIGS. 5 to 9, it is possible in principle to directly induce a chemical reaction by irradiating a surface of a fluororesin product with light in a wavelength region of not more than 100 nm with high intensity. Further, it is possible to induce decomposition of the atmosphere gas by the light of this wavelength region.

(3) Spectrum of Excitation Light

The synchrotron radiation which is employed in the present invention has the following characteristics:

(a) The synchrotron radiation has a continuous spectrum over a wide wavelength region. In more concrete terms, the synchrotron radiation has a continuous spectrum over a hard X-ray wavelength of about 0.1 Å and a far infrared region.

(b) The synchrotron radiation has high radiant intensity in the X-ray region. In this synchrotron radiation, intensity of light in the X-ray region such as a wavelength region of not more than 100 nm, for example, is higher by about 100 to 10000 times as compared with light which is emitted from a light source such as a deuterium lamp or a rare gas discharge plasma beam source which is employed in the prior art.

(c) The synchrotron radiation has strong directivity, and is substantially close to a parallel beam.

For reference, FIG. 3 illustrates relations between wavelengths and effective radiant intensity levels of synchrotron radiation beams that are emitted from various units. Curves E and F show beams that are emitted, respectively, from synchrotron the two radiation beam units, Compact storage rings NIJI-II and NIJI-III at Electrotechnical Laboratory, Japan. Referring to FIG. 3, $\lambda_{P1}$ and $\lambda_{P2}$ represent peak wavelengths of the synchrotron radiation beams.

FIG. 3 also shows relations between wavelengths and radiant intensity levels of beams which are employed in conventional methods. Straight lines A and B show beams emitted from ArF and $F_2$ excimer laser beam sources respectively. The laser beams shown by the straight lines A and B have single wavelengths of 193 nm and 1507 Å respectively. On the other hand, a curve C shows the spectrum of a beam emitted from a deuterium lamp beam source of 30W through an $MgF_2$ window. The deuterium lamp beam is a continuous beam having peaks of radiant intensity at wavelengths of 1216Å, 1245 Å and 1608 Å in a wavelength region exceeding 100 nm. The radiant intensity is extremely reduced toward 100 nm. Further, a curve D shows a beam which is emitted from a rare gas discharge plasma beam source such as an Ar miniarc beam source, for example. The Ar miniarc beam is a continuous beam having high radiant intensity in a wavelength region exceeding 100 nm. The radiant intensity is extremely reduced toward 100 nm. The deuterium lamp beam and the rare gas discharge plasma beam hardly contain any radiation in wavelength regions of not more than 100 nm and even if they contain some of such radiation, the radiant intensity levels thereof are so small that the same are not observed as effective levels. As clearly understood from FIG. 3, the synchrotron radiation contains a beam of the X-ray region, more specifically the wavelength region of not more than 100 nm, which is not attained in the light sources employed in the conventional methods.

According to the present invention, it is possible to excite and cut the C-F bond contained in the fluororesin product in a short time by the synchrotron radiation having a wavelength of not more than 100 nm. Further, it is possible to decompose every one of oxygen gas, nitrogen gas and hydrogen gas in a short time with the synchrotron radiation having a wavelength of not more than 100 nm, thereby generating a large quantity of radicals in a short time.

Consequently, it is possible to form a large number of hydrophilic groups on the surface of the fluororesin product, thereby obtaining a surface which is excellent in wettability and hydrophilicity. According to the present invention, therefore, it is possible to simultaneously carry out cutting of the chemical bond which is contained in the fluororesin product and decomposition of the atmosphere gas by the same light source.

In general, a beam having a short wavelength is readily transmitted through a substance. The synchrotron radiation having the peak of the light quantity in the wavelength region of at least 3 nm and not more than 6 nm contains a number of beams having wavelengths transmittable through fluororesin. On the other hand, the C-X bond has a light absorption peak in the vicinity of about 5 nm as hereinabove described, and hence the synchrotron radiation having a wavelength in proximity to 5 nm is partially absorbed when it is transmitted through the fluororesin product. The synchrotron radiation which is absorbed by the fluororesin product excites and cuts the C-X bond in this fluororesin product. Consequently, portions other than the surface which is directly irradiated with the beam are also modified. In other words, it is also possible to modify the interior of the fluororesin product. According to this process, it is possible to introduce hydrophilic groups into a larger number of pores in a porous fluororesin product which is employed as a filter, in particular.

FIG. 1 schematically shows an apparatus 1 for preparing a surface-modified fluororesin product which can be preferably employed in the present invention. The apparatus 1 includes a vacuum chamber 2, and a sample holder 3 contained in the vacuum chamber 2. A high molecular material 4 to be surface-modified is placed on the sample holder 3. A beam inlet 5 is provided on a side wall 2a of the vacuum chamber 2. An exhaust port 6 is provided on another side wall 2b of the vacuum chamber 2, so that the vacuum chamber 2 can be evacuated by a vacuum pump (not shown) or the like. An atmosphere gas inlet 7 is provided on still another side wall 2c of the vacuum chamber 2, so that an atmosphere gas can be introduced into the chamber 2 by opening a valve V. Synchrotron radiation 18 (hereinafter referred to as an SR beam) which is emitted from an electron storage ring (SR ring) 8 is introduced into the vacuum chamber 2 through the beam inlet 5, to be applied to the high molecular material 4 which is placed on the sample holder 3.

A process of modifying a surface of a fluororesin product through the apparatus 1 will now be described. The fluororesin product serving as the high molecular material 4 is placed on the sample holder 3, and then the chamber 2 is evacuated to $10^{-7}$ Torr to $10^{-5}$ Torr by a vacuum pump (not shown) or the like. Then, the atmosphere gas is introduced into the chamber 2 from the gas inlet 7 at a total pressure of about $10^{-2}$ Torr to 1 Torr, as needed. Then, a synchrotron radiation beam unit (e.g., NIJI-II at Electrotechnical Laboratory, Japan) is employed as a light source, for example, to irradiate the high molecular material 4 with a zero-order beam of an SR beam having a peak wavelength of at least 3 nm and not more than 6 nm, more preferably about 5 nm, which is emitted from the SR ring 8 in a vacuum direct coupling system employing no window, at a dosage of about 1 J·cm$^{-2}$ to 100 J·cm$^{-2}$. If necessary, an X-ray mask 9 may be provided above the surface of the high molecular material 4 at a constant space (proximity gap), so that the high molecular material 4 is irradiated with the SR beam through the mask 9. Alternatively, a well-known filter method may be employed to remove synchrotron radiation having a wavelength exceeding 10 nm. In this case, the filter may be preferably formed by a thin film of beryllium (Be) having a thickness of 10 μm to 50 μm, a thin film of carbon (C) having a thickness of 5 μm to 30 μm, or the like. Means for extracting a beam of a specific wavelength region includes an SR beam outgoing window, a light transmission window (mask membrane) and an X-ray filter, which may be employed independently or in a combination of at least two such means. It is possible to extremely reduce a blur resulting from a diffraction effect by employing an SR beam having a wavelength of not more than 10 nm. After the high molecular material 4 is irradiated with the SR beam to a prescribed dosage, the internal pressure of the chamber 2 is returned to the ordinary atmospheric level, so that the non-modified material 4 can be taken out into the air.

Figure 2A:
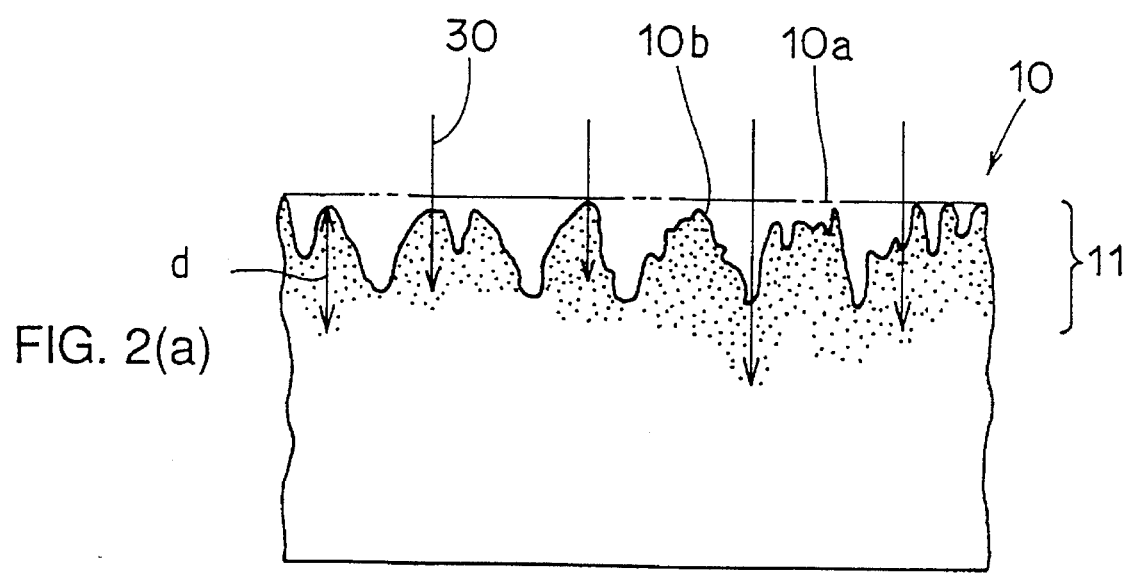
FIGS. 2(a) and 2(b) are sectional views typically showing fluororesin surfaces modified according to the present invention.
Figure 2B:
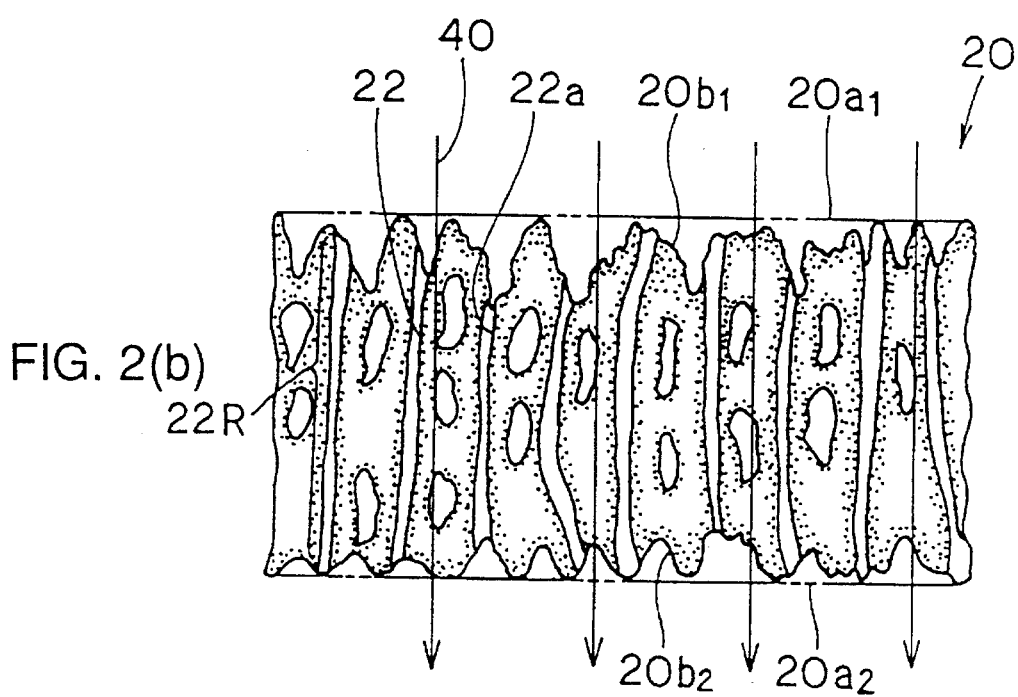
Figure 4A:
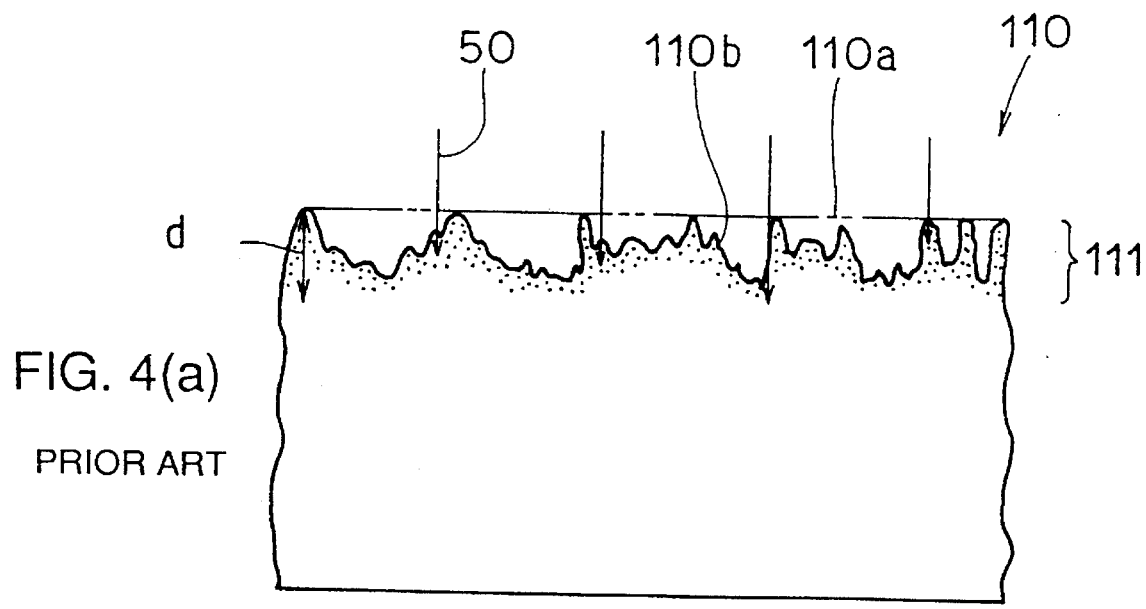
FIGS. 4(a) and 4(b) are sectional views typically showing conventionally modified fluororesin surfaces.
Figure 4B:
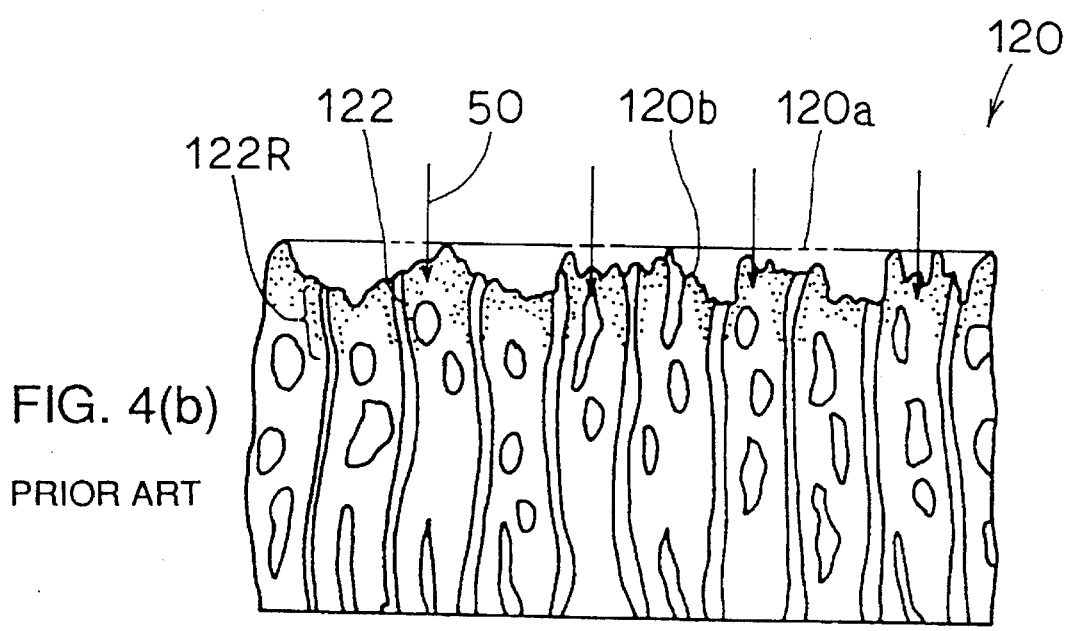

FIGS. 2(a) and 2(b) are sectional views typically showing fluororesin products which are surface-modified by the present invention. FIG. 2(a) shows a surface of a fluororesin product molded in the form of a film is irradiated with an SR beam having a wavelength of not more than 100 nm in an atmosphere containing at least one gas selected from the group consisting of oxygen gas, nitrogen gas and hydrogen gas. Numeral 10 denotes the fluororesin molding, numeral 10a (in a two-dot chain line) denotes an unmodified surface, numeral 10b denotes a modified surface, numeral 11 denotes a surface-modified layer, symbol d denotes the thickness of the surface-modified layer 11, and arrow 30 denotes the SR beam. Penetration of the beam 30 is deeper than the presentation of a beam having a wavelength of at least about 100 nm which is employed in the prior art. According to the present invention, it is possible to further increase the thickness d, which depends on the peak wavelength and the dosage of the SR beam 30. When a beam of a shorter wavelength is employed in a wavelength region of not more than 100 nm, there is a tendency that a large, deep or rough texture can be formed on the surface. When such a large or deep texture formed on the surface, a printing ink, a paint or another material readily penetrates into the texture, with improved adhesiveness. Further, the surface area is increased by the texture, thereby increasing the number of hydrophilic groups that are introduced into the surface. Therefore, the fluororesin product is improved in wettability and adhesiveness with respect to another material.

According to the present invention, it is possible to readily control the spectrum of the SR beam by controlling conditions of the SR beam unit (light source). Since the SR beam is a continuous beam having a continuous spectrum, it is possible to selectively extract a photon flux of a desired wavelength corresponding to the light absorption spectrum of the fluororesin product and/or that of the atmosphere gas in a wavelength region of not more than 100 nm. According to the present invention, it is possible to simultaneously carry out decomposition of the atmosphere gas and surface modification of the fluororesin product by employing a single SR beam unit as the light source. In the present invention, it is possible to readily control improvements in adhesiveness and hydrophilicity of the surface as compared with the prior art. When an SR beam having a wavelength of not more than 100 nm is employed, it is possible to decompose oxygen, nitrogen, hydrogen or a mixed gas thereof in a short time, thereby generating a large quantity of radicals. Consequently, it is possible to remarkably reduce the treatment time which is required for surface modification.

Referring to FIG. 2(b), on the other hand, a surface of a porous fluororesin molding is irradiated with an SR beam having a peak of its light quantity at a wavelength of at least 3 nm and not more than 6 nm in oxygen, nitrogen, hydrogen or a mixed gas thereof so that hydrophilic groups are introduced into pore surfaces. Numeral 20 denotes the porous fluororesin molding, numeral $20a_1$ (in a two-dot chain line) denotes a first unmodified surface, numeral $20a_2$ (in a two-dot chain line) denotes a second unmodified surface opposite the first unmodified surface $20a_1$, numeral $20b_1$ denotes a first modified surface, numeral $20b_2$ denotes a second modified surface opposite to the modified surface $20b_1$, numeral 22 denotes pores, numeral 22a denotes surfaces of the pores 22, numeral 22R denotes surfaces of modified pores, and arrow 40 denotes the SR beam having the peak of the light quantity at the wavelength of at least 3 nm and not more than 6 nm. The SR beam 40 having the peak in the wavelength region of at least 3 nm and not more than 6 nm includes a number of beams having wavelengths which are transmitted through fluororesin. A part of the SR beam having a wavelength in proximity to 5 nm is absorbed by the fluororesin product to excite and cut C-F bonds on the surfaces $20a_1$ and $20a_2$ and the surfaces 22a of the pores 22. Consequently, the fluororesin product is modified also on the surfaces $20a_2$ and 22a opposite the surface $20a_1$ which is directly irradiated with the SR beam 40. Thus, it is possible to uniformly introduce hydrophilic groups into the overall surfaces 22a denoted by numeral 22R, of the pores 22, which are in contact with the atmosphere gas. The present invention can be preferably employed for manufacturing a filter for molecular level filtration such as a bio-analogous membrane or an ion exchange film, which requires hydrophilic groups on overall surfaces of its pores.

EXAMPLES

Concrete experimental data will now be described.

Example 1

Referring to FIG. 1, a polytetrafluoroethylene (PTFE) film of about 20 μm in thickness was placed on the sample holder 3 as the high molecular material 4. Then, a vacuum pump (not shown) was employed to decompress or evacuate the vacuum chamber 2 to $10^{-7}$ Torr. Then, a synchrotron radiation beam unit (NIJI-II at ETL: Electrotechnical Laboratory Japan) was employed to irradiate a surface of the PTFE film with synchrotron radiation having a peak wavelength of 5 nm in a vacuum direct coupling system with no window, at a dosage of 10 J·cm$^{-2}$ for 1 second. The resulting surface-modified film (hereinafter referred to as sample 1) was taken out of the vacuum chamber 2 into the air. Hydrophilicity of the sample 1 was evaluated by measuring the contact angle of the modified surface with respect to water. Table 1 shows the result. In this evaluation, water at 20° C. was brought into contact with the surface of the sample 1, and the contact angle of the water with respect to the surface was measured with a measuring device.

Example 2

A well-known filter method using a thin film filter (20 μm in thickness) of beryllium (Be) was employed to cut off or filter out an SR beam in a wavelength region of at least about 10 nm. The dosage of the SR beam was 100 J·cm$^{-2}$ and the irradiation time was 10 seconds. A surface of a PTFE film was modified similarly to Example 1, except the aforementioned conditions. This resulting modified film is referred to as sample 2. Then, hydrophilicity on the surface of the sample 2 was evaluated similarly to Example 1. Table 1 also shows the result.

TABLE 1

| Sample | Contact Angle of Water (°) |
| --- | --- |
| Sample 1 | |
| untreated | 108° |
| treated | 58° |
| Sample 2 | |
| untreated | 108° |
| treated | 60° |

As shown in Table 1, it has been clarified that it is possible to readily modify a surface of a fluororesin product in a short time by irradiating the surface with an SR beam. It has also been clarified from Example 2 that an SR beam having a wavelength of not more than 10 nm substantially contributes to surface modification of a fluororesin product. The samples 1 and 2 were observed with an electron microscope, whereby it was determined that fine texture layers of 0.3 μm to 2.0 μm were formed on the surfaces of the films that were irradiated with the SR beams.

Example 3

Referring again to FIG. 1, a porous PTFE film (tradename POREFLON by Sumitomo Electric Industries, Ltd.) having porosity of 70% and a mean pore size of 0.3 μm to 0.6 μm) and a thickness of about 1 μm was placed on the sample holder 3 as the high molecular material 4. It is preferable to provide a constant space between the high molecular material 4 and the sample holder 3. Then, a vacuum pump (not shown) was employed to decompress i.e. evacuate, the vacuum chamber 2 to $10^{-6}$ Torr. Then, a mixed gas of nitrogen, oxygen and hydrogen was introduced through the gas inlet 7 at a total pressure of 0.1 Torr. Then, a synchrotron radiation beam unit (NIJI-II at ETL) was employed to irradiate the surface of the porous film with an SR beam having a peak wavelength of 5 nm in a vacuum direct coupling system with no window, at a dosage of 100 J·cm$^{-2}$ for 1 second. Then, the modified film (sample 3) was taken out into the air.

Similarly to Example 1, hydrophilicity was evaluated on surfaces opposite those that were directly irradiated with the SR beam. Table 2 shows the results.

TABLE 2

| Sample | Contact Angle of Water (°) |
| --- | --- |
| Sample 3 | |
| untreated | 108° |
| treated | 65° |

As shown in Table 2, it has been clarified that an improvement in hydrophilicity is achieved not only on a surface that is directly irradiated with a beam but also on another surface opposite thereto i.e. a back surface, upon irradiation of the first or front surface with the SR beam having a peak of its light quantity at a wavelength of about 5 nm. The surface of the sample 3 which was not irradiated with the SR beam, and its pores, were analyzed by well-known X-ray photoelectron spectroscopic analysis, whereby it was recognized that hydrophilic groups were also formed on these surfaces.

FIG. 3 illustrates the spectra of the SR beams employed in Examples 1 to 3. Referring to FIG. 3, a curve G corresponds to the SR beams employed in Examples 1 and 3, while a curve H corresponds to the SR beam which was transmitted through the filter employed in Example 2.

The present invention is applicable not only to PTFE but to another fluororesin material such as that described above, for example. According to the present invention, further, it is also possible to modify only a desired region on a surface of a fluororesin product by employing an X-ray mask or the like. In this case, it is possible to form a pattern which is reduced in diffraction blur due to the mask, with an SR beam having a wavelength of not more than 100 nm, more preferably not more than 50 nm. Therefore, it is possible to clarify or sharpen the boundary between a surface-modified region and an unmodified region having hydrophobicity in the fluororesin product. Further, it is possible to correctly transfer a pattern such as a character or a figure by applying an SR beam through an X-ray mask having a pattern corresponding to the modified portion such as the character or the figure. According to the present invention, it is possible to control the thickness of the surface-modified layer in response to the peak wavelength, intensity per unit area and the irradiation time. According to the present invention, further, it is possible to form a modified layer also on a region other than a surface which is directly irradiated with the SR beam. The present invention can be preferably employed for introducing hydrophilic groups into surfaces of pores forming a porous fluororesin molding such as a filter, in particular.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process for modifying a surface of a fluororesin product, comprising a step of irradiating said surface of said fluororesin product with synchrotron radiation having a wavelength of not more than 100 nm to chemically modify polymer molecules of said fluororesin product.

2. The process in accordance with claim 1, wherein said synchrotron radiation has a light quantity peak in the wavelength region of about 3 nm to about 6 nm.

3. The process in accordance with claim 1, wherein said irradiating step is carried out under an atmosphere containing a gas selected from the group consisting of oxygen, a mixture of nitrogen and hydrogen, a mixture of oxygen and hydrogen, and a mixture of oxygen, nitrogen and hydrogen, thereby introducing hydrophilic groups into said surface of said fluororesin product.

4. The process in accordance with claim 1, wherein said surface of said fluororesin product is improved in wettability with respect to a paint by said irradiating step.

5. The process in accordance with claim 1, wherein said surface of said fluororesin product is improved in adhesiveness by said irradiating step.

6. The process in accordance with claim 1, wherein said surface of said fluororesin product is made hydrophilic by said irradiating step.

7. The process in accordance with any of claims 1, wherein said fluororesin product is a porous filter.

8. The process in accordance with claim 1, wherein said irradiating step is carried out to apply a total irradiation dosage of from 1 $J/cm^2$ to 100 $J/cm^2$ to said surface.

9. The process in accordance with claim 8, wherein said irradiation dosage is from about 10 $J/cm^2$ to 100 $J/cm^2$.

10. The process in accordance with claim 8, wherein said irradiating step is carried out for a total time of from 1 to 10 seconds.

11. The process in accordance with claim 1, wherein said chemically modifying said polymer molecules involves cutting C-X bonds of said fluororesin product, where X is at least one atom selected from the group consisting of hydrogen, nitrogen, and fluorine.

12. The process in accordance with claim 11, wherein said X is fluorine, and wherein said chemically modifying said polymer further involves substituting another chemical species for said fluorine when said C-X bonds are cut.

13. The process in accordance with claim 1, wherein said surface is a front surface of said fluororesin product that is impinged by said synchrotron radiation, and wherein said synchrotron radiation penetrates entirely through said fluororesin product to simultaneously modify a back surface of said fluororesin product opposite said front surface.

14. The process in accordance with claim 1, wherein said fluororesin product includes pores extending from said surface into a bulk interior of said product, and wherein said synchrotron radiation penetrates into and chemically modifies said bulk interior.

15. The process in accordance with claim 1, wherein said irradiating step is further carried out to physically modify said surface and form a texture thereon.

16. The process in accordance with claim 15, wherein said texture is formed to have a texture depth of from 0.3 µm to 2.0 µm.

17. The process in accordance with claim 1, wherein said irradiating step is carried out in an atmosphere containing at least one gas selected from the group consisting of oxygen, nitrogen and hydrogen so as to decompose said gas and generate radicals therefrom simultaneously with said chemically modifying said polymer molecules.

18. The process in accordance with claim 1, further comprising filtering said synchrotron radiation to include only wavelengths of not more than 10 nm.

* * * * *

UNITED STATES PATENT AND TRADEMARK OFFICE
CERTIFICATE OF CORRECTION

PATENT NO. : 5,555,549
DATED : September 10, 1996
INVENTOR(S) : Hiroyuki Nakaishi It is certified that error appears in the above-indentified patent and that said Letters Patent is hereby corrected as shown below:

Col. 1, line 52, after "its" insert --employment and disposal of--.

Col. 2, line 7, replace "Light" by --light--;
line 16, replace "which" by --that--.

Col. 6, line 29, replace "synchrotron the two" by --the two synchrotron--.

Col. 8, line 19, replace "is" by --that has been--;
line 26, replace "d" by --$\underline{d}$--;
line 28, delete "pre-";
line 29, replace "sentation" by --penetration--;
line 32, replace "d" by --$\underline{d}$--;
line 37, after "texture" insert --is--.

Col. 9, line 9, delete "to", after "the" insert --first--;
line 25, after "22a" insert --, i.e. at regions--;
line 42, after "Laboratory" insert --,--.

UNITED STATES PATENT AND TRADEMARK OFFICE
CERTIFICATE OF CORRECTION

PATENT NO. : 5,555,549
DATED : September 10, 1996
INVENTOR(S) : Hiroyuki Nakaishi It is certified that error appears in the above-indentified patent and that said Letters Patent is hereby corrected as shown below:

Col. 10, line 21, after "2.0 µm" insert --texture depth--;
Col. 12, line 7, replace "any of claims" by --claim--.

Signed and Sealed this

Fourth Day of February, 1997

Attest:

BRUCE LEHMAN

Attesting Officer  Commissioner of Patents and Trademarks